United States Patent [19]
Instance

[11] Patent Number: 4,849,043
[45] Date of Patent: Jul. 18, 1989

[54] METHOD OF PRODUCING LABELS

[76] Inventor: David J. Instance, Past Heap Farm, Pembury, Tunbridge Wells, Kent, England

[21] Appl. No.: 586,965

[22] Filed: Mar. 7, 1984

[51] Int. Cl.[4] .......................... B31F 1/00; B32B 31/12; B32B 31/18

[52] U.S. Cl. ...................................... 156/227; 40/299; 53/415; 53/460; 156/247; 156/257; 156/267; 156/268; 156/277; 283/81; 428/40; 428/906; 493/335; 493/375

[58] Field of Search ............... 156/192, 227, 268, 267, 156/277, 284, 70, 182, 211, 213, 216, 217, 248, 249, 257, 263, 264, 265, 247; 40/2 R, 306, 312, 594; 206/459, 820, 831; 428/40–42, 906; 53/415, 460, 430; 493/335, 325, 346, 382, 210, 264, 266, 961

[56] References Cited

U.S. PATENT DOCUMENTS 4,281,762 8/1981 Hattemer ............................ 206/390
4,359,358 11/1982 Hattemer ........................ 156/268 X
4,529,229 7/1985 Glibbery ............................... 283/81

FOREIGN PATENT DOCUMENTS 0090882 10/1983 European Pat. Off. .
0098092 1/1984 European Pat. Off. .
2112886 9/1972 Fed. Rep. of Germany .
1475304 6/1977 United Kingdom .
2115744 9/1983 United Kingdom .
2115775 9/1983 United Kingdom .

*Primary Examiner*—Michael W. Ball
*Assistant Examiner*—Thomas Bokan
*Attorney, Agent, or Firm*—Birch, Stewart, Kolasch & Birch

[57] ABSTRACT

A method of producing a succession of self-adhesive labels carried on a backing of release material, which method comprises cutting a laminar material which comprises a web coated on its reverse side with a pressure-sensitive adhesive and having a backing of a release material, the cutting being performed in such a manner that all the layers of the laminar material other than the backing layer are cut and so as to cut a succession of spaced label base portions on the backing; applying an adhesive either across the whole of the upper surface of the web or to an area within each label base portion; removing from the backing waste portions of the web outside the label base portions; applying either a folded sheet and envelope, a multiple-ply label or an envelope containing an article to cover that area of each of the label base portions which has been coated with adhesive.

20 Claims, 1 Drawing Sheet

METHOD OF PRODUCING LABELS

BACKGROUND OF THE INVENTION

1. Field of the Invention

The present invention relates to a method for producing labels.

2. Description of the Prior Art

In my British Patent Specification Nos. 1475304, 2115744 and 2115775 I describe various different labels having an increased surface area thereby enabling a greater amount of printed information to be carried by the labels than usual. Although such labels can be made individually, it is usually more convenient to arrange them as a sequence of labels carried on a backing layer of release material, preferably in the form of a reel, thereby providing a convenient supply of labels for easy and efficient application to containers to be labelled.

SUMMARY OF THE INVENTION

The present invention aims to provide a method of producing a succession of such labels on a backing layer of release material.

According to a first aspect of the present invention there is provided a method of producing a succession of self-adhesive labels (i.e. labels coated on the reverse side with a pressure-sensitive adhesive) carried on a backing of release material, which method comprises cutting a laminar material which comprises a web coated on its reverse side with a pressure-sensitive adhesive and having a backing of a release material, the cutting being performed in such a manner that all of the layers of the laminar material other than the backing layer are cut and so as to cut a succession of spaced label base portions on the backing; applying an adhesive either across the whole of the upper surface of the web or to an area within each label base portion; removing from the backing waste portions of the web outside the label base portions; applying either a folded sheet and envelope, a multiple-ply label or an envelope containing an article to cover that area of each of the label base portions which has been coated with adhesive.

According to a second aspect of the present invention there is provided a method of producing a succession of self-adhesive labels (i.e. labels coated on the reverse side with a pressure-sensitive adhesive) carried on a backing of release material, which method comprises cutting a laminar material which comprises a web coated on its reverse side with a pressure-sensitive adhesive and having a backing of a release material, the cutting being performed in such a manner that all of the layers of the laminar material other than the backing layer are cut and so as to cut a succession of spaced label base portions on the backing; removing from the backing waste portions of the web outside the label base portions; applying an adhesive to an area within each label base portion; and applying either a folded sheet and envelope, a multile-ply label or an envelope containing an article to cover that area of each of the label base portions which has been coated with adhesive.

The backing carrying the resultant labels can then be wound into a reel to form a supply roll, or can be folded to form a fan-folded supply of labels.

Preferably the folded sheet and envelopes applied to the web are those described in my British Patent No. 1475304 and consists of a sheet (e.g. a sheet of printed instructions) and an envelope therefor, both formed from a single folded sheet, e.g. of paper, wherein the single sheet is divided into at least two parallel rows of three rectilinear panels each, the two outer panels of a first row being separated from the corresponding two outer panels of the next row by cuts and the middle panels of the said first and next rows being joined to one another through a line of perforations aligned with the cuts, the single sheet being so folded that the panels of the first row form the envelope and the sheet, e.g. of instructions, is composed of the panels of the next row and of any further rows which are folded to lie adjacent one face of the middle panel of the first row, whereby the sheet, e.g. of instructions, is enclosed in the envelope but can be removed and detached therefrom by tearing along the line of perforations, or are those described in my British Patent Specification No. 2115744 and consist of a sheet (e.g. a sheet of printed instructions) and an envelope therefor, both formed from a single folded sheet, e.g. of paper, wherein the single sheet is divided into at least two parallel rows of three rectilinear panels each, the panels of the first row being separated from the corresponding panels of the next row by a line of perforations and each of the two outer panels of the first row of panels having a portion cut away inwardly from the respective outer edge of the sheet adjacent the line of perforations so that the line of perforations stops short of the outer edges of the sheet, the single sheet being so folded that the panels of the first row form the envelope, and the sheet is composed of the panels of the next row and of any further rows which are folded to lie adjacent one face of the corresponding panels of the first row, whereby the sheet is enclosed in the envelope but can be removed and detached therefrom by tearing along the line of perforations.

Examples of the multiple-ply labels suitable for application to the web are those described in my British Patent Specification No. 2115775 and consist of a longitudinal strip divided into a series of panels by a plurality of transverse fold lines, the first two of the panels forming a front cover and a back cover respectively for enveloping the remaining panel or panels of the strip when folded, the transverse fold lines being spaced along the strip so that upon folding of the strip the said remaining panel or panels is or are folded to lie over the back cover and is or are in turn covered by folding of the front cover about the fold line between the front and back covers and wherein the front cover may extend beyond the area occupied by the back cover, and a band of adhesive is provided on the inner face of the free outer edge of the front cover panel adjacent to said outer edge for securing the outer edge of the front cover either to the back of the folded panel or panels along a region adjacent the fold line which lies between the back cover and the said remaining panel or panels, or to the surface of a support web for carrying the label, the front cover panel being arranged to be torn or otherwise opened to give access to the interior of the folded label.

In a preferred multiple-ply label, the front surface of the front cover is printed, for example, with textual information. Preferably the front surface is lithographically printed, the labels having been individually lithographically printed with a high quality printed image. Furthermore, such lithographically printed labels need not be provided with the remaining panel or panels of the labels of my British Patent Specification No. 2115775.

Accordingly, in a further preferred embodiment the multiple-ply label is a longitudinal strip divided into two panels by a transverse fold line, the two panels forming a front cover and a back cover respectively for the label when folded and the front surface of the front cover carrying a lithographically printed image, the transverse fold line being spaced along the strip so that upon folding of the strip about the fold line between the front and back covers the front cover lines over the back cover and may extend beyond the area occupied by the back cover, and a band of adhesive is provided on the inner face of the free outer edge of the front cover panel adjacent to said outer edge for securing the outer edge of the front cover either to the back cover or to the surface of a support web for carrying the label, the front cover panel being arranged to be torn or otherwise opened to give access to the interior of the folded label.

When an envelope containing an article is adhered to the label base portion, the article contained in the envelope can be a printed sheet of instructions, a booklet or any other suitable flat article relating to the product with which the label is to be associated.

The envelope containing an article is formed from a single folded sheet, the sheet being divided into a row of three rectilinear panels the row consisting of a middle panel and two outer panels, the middle panel having at one longitudinal edge thereof a lower panel and at the other longitudinal edge thereof an upper panel which is separated from the middle panel by a line of perforations, the envelope being formed by folding the two outer panels of the row and the lower panel over the rear face of the middle panel so that the envelope is closed either by adhering the rear face of the envelope to a surface or by folding the upper panel or a portion thereof over the rear face of the middle panel, whereby the envelope so closed can be opened by tearing along the line of perforations so that the article therein can be removed.

Preferably, the envelope, as in a conventional envelope is a sheet which consists of a central panel surrounded by four foldable panels which can be folded along respective fold lines to provide a continuous rear surface which is coextensive with the front surface of the central panel envelope and consists of each of the four folded panels. A line of performations can be provided along an edge of or in the front surface of the envelope so that when it is attached to the label base portion the envelope can readily be opened and the article therein removed by tearing along the line of perforations.

Alternatively, the envelope can be a sheet which consists of a central panel surrounded by three foldable panels and one panel which is not folded. The three foldable panels are folded along respective fold lines to provide a continuous rear surface which is coextensive with the front surface of the envelope and consists of each of the three folded panels. The rear surface of the fourth, unfolded panel is adjacent the said continuous rear surface and the said rear surfaces may be adhered either directly or via a support web to the label base portion. A line of perforations joins the fourth, unfolded panel to the rest of the envelope. When the envelope is adhered to the label base portion tearing along the line of perforations separates the adhered fourth panel from the adhered envelope so that the envelope can be opened and the article therein removed.

In each of the above-described forms of the envelope containing an article, the front surface of the envelope may be pre-printed with textual information.

DETAILED DESCRIPTION OF THE PREFERRED EMBODIMENTS

Figure 1:
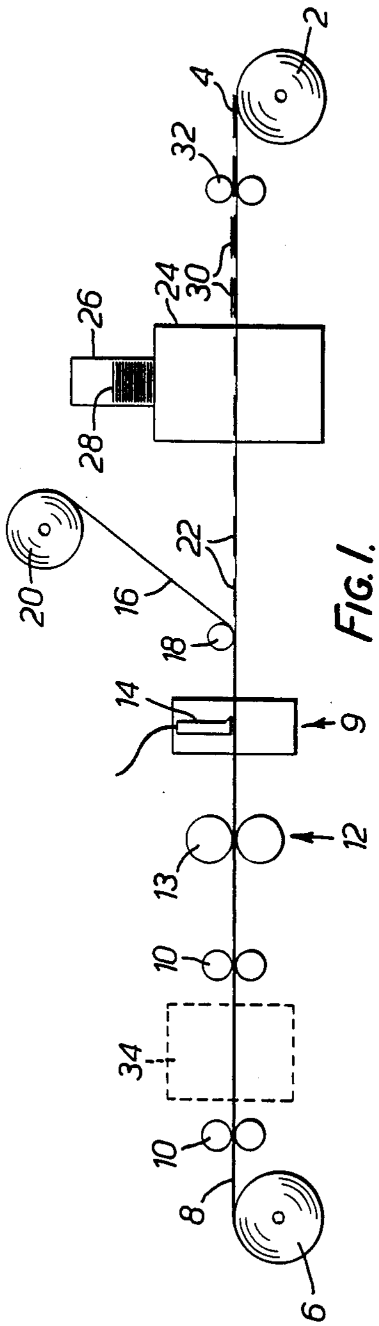
FIG. 1 is a diagrammatic elevational view of an apparatus suitable for performing the method of the present invention.

Referring to the drawings, there is shown an apparatus for preparing a reel 2 carrying a succession of self-adhesive labels 4 (i.e. labels coated on the reverse side with a pressure sensitive adhesive). The reel 2 of labels is produced starting from a reel 6 of a laminar material 8 commonly known in the art as self-adhesive stock or pressure-sensitive stock. Such laminar material usually consists of a web of paper of indeterminate length coated on its reverse side with a pressure-sensitive adhesive, with the adhesive side of the paper protected with a backing of a release material such as silicone-faced backing paper. The laminar material 8 is unwound from the reel 6 and guided by guide rollers 10 to a die-cutting station 12 where all the layers of the laminar material other than the backing layer are cut by a die-cutting roller 13 to form a succession of spaced label base portions on the backing layer. From the die-cutter, the laminar material 8 passes to a coating station 9 which includes an applicator 14 which is arranged either to apply adhesive, e.g. PVA, across the whole of the upper surface of the web of paper or alternatively to selected areas within each of the label base portions when the labels, the folded sheets and envelopes or the envelopes containing an article to be applied to the label base portions are of a smaller size than the area of the upper surface of the label base portions. Either the whole surface area of the label base portions, or only part thereof, is coated with adhesive, depending upon the dimensions of either the folded sheet and envelope, the envelope containing an article or the multiple-ply label which is to be adhered to the label base portion.

After the adhesive has been applied, the waste web remnant 16 consisting of portions of the web outside the label base portions is removed from the web at roller 18 and wound up on a roll 20. Removal of the waste web material leaves a succession of spaced apart label base portions 22 which have the whole or part of their upper surface coated with adhesive. These are conveyed to a further station 24 at which pre-printed labels 26 are transferred one at a time from a stack 28 of labels to each of the label base portions. The pre-printed labels may be, for example, multiple-ply labels as described in my British Patent Specification No. 2115775, or they may take the form of a sheet of instructions and an envelope therefor as described in my British Patent No. 1475304 or in my British Patent Application No. 2115744, or they may take the form of an envelope containing an article as hereinbefore described.

The assemblies 30 of the pre-printed labels 26 and the label base portions 22 are then passed through nip rollers 32 where the pre-printed labels are pressed on to the base portions and thereafter the backing layer carrying the resultant labels 4 is wound into a reel 2. Alternatively, instead of winding the backing layer into a reel it may be fan-folded to provide a fan-folded supply of labels in which the backing sheet is folded across its width at positions corresponding to the spacings between the base label portions on the backing sheet.

Figure 2:
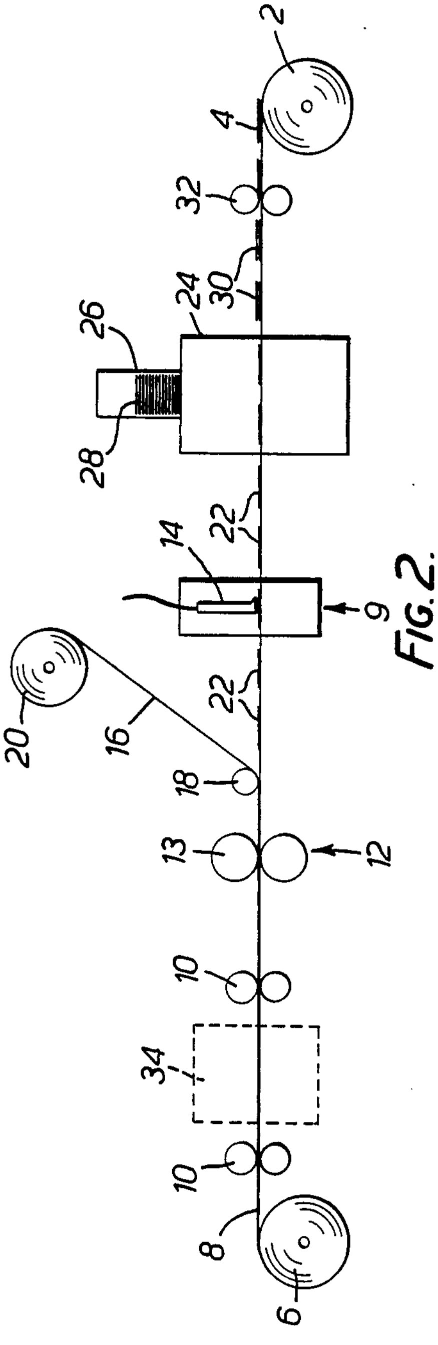
FIG. 2 is a diagrammatic elevational view of an alternative apparatus for performing the method of the present invention.

In accordance with the second aspect of the present invention a reel carrying a succession of self-adhesive labels is prepared in the same way as described above, except that as shown in FIG. 2 the coating station 14 at which adhesive is applied to the upper surface of the web is placed downstream of the zone in which waste web material is removed from the backing rather than upstream thereof as described above. In this arrangement waste web material is removed immediately after the web of the laminar material 8 has been die-cut, and only after the waste web material has been removed is adhesive applied to the upper surface of the resultant spaced label base portions 22. The adhesive may be applied across the whole of the upper surface of the label base portions, or alternatively to only part of the said upper surface when the labels, the folded sheets and envelopes, or the envelopes containing an article to be applied to the label base portions occupy a smaller area than the area of the upper surface of the label base portions.

When the labels which are being produced are labels in which the sheet and envelope, the multiple-ply label or the envelope containing an article carried by each label base portion occupy an area smaller than the area of the upper surface of the label base portion it is generally desired to print additional textual matter on those parts of the label base portions which are not going to be subsequently covered by either the sheet and envelope, by the said multiple-ply label or the envelope containing an article, as the case may be. If this is the case, the apparatus described above can additionally include one or more printing stations 34 (shown diagrammatically by dashed lines in the drawings) located upstream of the die-cutting station 12. In this arrangement the die-cutter 13 is arranged to make the cuts through the web to form label base portions at positions which take into account the location of the textual matter which has been printed onto the web.

I claim:

1. A method of producing a succession of self-adhesive labels carried on a backing of release material, which comprises:

(a) cutting a laminar material which comprises a web coated on its reverse side with a pressure-sensitive adhesive and having a backing of a release material, the cutting being performed in such a manner that all layers of the laminar material other than the backing layer are cut so as to cut a succession of spaced label base portions on the backing followed by the step of;

(b) applying an adhesive at least to an area within each label base portion followed by the step of;

(c) removing from the backing waste portions of the web outside the label base portions followed by the step of;

(d) successively applying individual folded labels to cover the respective succession of areas of the label base portions which have been coated with adhesive, the folded labels being either a folded sheet and envelope, a multiple-ply label or an envelope containing an article.

2. A method according to claim 1, wherein the backing carrying the resultant labels is wound into a reel to form a supply roll.

3. A method according to claim 1, wherein the backing carrying the resultant labels is folded to form a fan-folded supply of labels.

4. A method according to claim 1, wherein the folded sheet and envelope is a sheet and an envelope therefor, both formed from a single folded sheet, wherein the single sheet is divided into at least two parallel rows of three rectilinear panels each, the two outer panels of a first row being separated from the corresponding two outer panels of the next row by cuts and the middle panels of the said first and next rows being joined to one another through a line of perforations aligned with the cuts, the single sheet being so folded that the panels of the first row form the envelope and the sheet, is composed of the panels of the next row and of any further rows which are folded to lie adjacent one face of the middle panel of the first row, whereby the sheet, is enclosed in the envelope but can be removed and detached therefrom by tearing along the line of perforations.

5. A method according to claim 1, wherein the folded sheet and envelope is a sheet and an envelope therefor, both formed from a single folded sheet, wherein the single sheet is divided into at least two parallel rows of three rectilinear panels each, the panels of the first row being separated from the corresponding panels of the next row by a line of perforations and each of the two outer panels of the first row of panels having a portion cut away inwardly from the respective outer edge of the sheet adjacent the line of perforations so that the line of perforations stops short of the outer edges of the sheet, the single sheet being so folded that the panels of the first row form the envelope, and the sheet is composed of the panels of the next row and of any further rows are folded to lie adjacent one face of the corresponding panels of the first row, whereby the sheet is enclosed in the envelope but can be removed and detached therefrom by tearing along the line of perforations.

6. A method according to claim 1, wherein the multiple-ply label is a longitudinal strip divided into a series of panels by a plurality of transverse fold lines, the first two of the panels forming a front cover and a back cover respectively for enveloping the remaining panel or panels of the strip when folded, the transverse fold lines being spaced along the strip so that upon folding of the strip the said remaining panel or panels is or are folded to lie over the back cover and is or are in turn covered by folding of the front cover about the fold line between the front and back covers and wherein the front cover may extend beyond the area occupied by the back cover, and a band of adhesive is provided on the inner face of the free outer edge of the front cover panel adjacent to said outer edge for securing the outer edge of the front cover either to the back of the folded panel or panels along a region adjacent the fold line which lies between the back cover and the said remaining panel or panels, or to the surface of a support web for carrying the label, the front cover panel being arranged to be torn or otherwise opened to give access to the interior of the folded label.

7. A method according to claim 6, wherein the outer surface of the front cover carries a lithographically-printed image.

8. A method according to claim 1, wherein the multiple-ply label is a longitudinal strip divided into two panels by a transverse fold line, the two panels forming a front cover and a back cover respectively for the label when folded and the front surface of the front cover carrying a lithographically printed image, the transverse fold line being spaced along the strip so that upon folding of the strip about the fold line between the front and back covers the front cover lies over the back cover and may extend beyond the area occupied by the back cover, and a band of adhesive is provided on the inner face of the free outer edge of the front cover panel adjacent to said outer edge for securing the outer edge of the front cover either to the back cover or to the surface of a support web for carrying the label, the front cover panel being arranged to be torn or otherwise opened to give access to the interior of the folded label.

9. A method according to claim 1, wherein the envelope containing an article is formed from a single folded sheet, the sheet being divided into a row of three rectilinear panels, the middle panel having at one longitudinal edge thereof a lower panel and at the other longitudinal edge thereof an upper panel which is separated from the middle panel by a line of perforations, the envelope being formed by folding the two outer panels of the row and the lower panel over the rear face of the middle panel so that the envelope is closed either by adhering the rear face of the envelope to a surface or by folding the upper panel or a portion thereof over the rear face of the middle panel whereby the envelope so closed can be opened by tearing along the line of perforations so that the article therein can be removed.

10. A method according to claim 1, wherein prior to the cutting of the web of the laminar material, the laminar material is passed through one or more printing stations where textual matter is printed onto the web.

11. A method of producing a succession of self-adhesive labels carried on a backing of release material, which comprises:

(a) cutting a laminar material which comprises a web coated on its reverse side with a pressure-sensitive adhesive and having a backing of a release material, the cutting being performed in such a manner that all layers of the laminar material other than the backing layer are cut and so as to cut a succession of spaced label base portions on the backing followed by the step of;

(b) removing from the backing waste portions of the web outside the label base portions followed by the step of;

(c) applying an adhesive to an area within each label base portion followed by the step of;

(d) successively applying individual folded labels to cover the respective succession of areas of the label base portions which have been coated with adhesive, the folded labels being either a folded sheet and envelope, a multiple-ply label or an envelope containing an article.

12. A method according to claim 11, wherein the backing carrying the resultant labels is wound into a reel to form a supply roll.

13. A method according to claim 11, wherein the backing carrying the resultant labels is folded to form a fan-folded supply of labels.

14. A method according to claim 11, wherein the folded sheet and envelope is a sheet and an envelope therefor, both formed from a single folded sheet wherein the single sheet is divided into at least two parallel rows of three rectilinear panels each, the two outer panels of a first row being separated from the corresponding two outer panels of the next row by cuts and the middle panels of the said first and next rows being joined to one another through a line of perforations aligned with the cuts, the single sheet being so folded that the panels of the first row form the envelope and the sheet is composed of the panels of the next row and of any further rows which are folded to lie adjacent one face of the middle panel of the first row, whereby the sheet, e.g. of instructions, is enclosed in the envelope but can be removed and detached therefrom by tearing along the line of perforations.

15. A method according claim 11, wherein the folded sheet and envelope is a sheet and an envelope therefor, both formed from a single folded sheet, wherein the single sheet is divided into at least two parallel rows of three rectilinear panels each, the panels of the first row being separated from the corresponding panels of the next row by a line of perforations and each of the two outer panels of the first row of panels having a portion cut away inwardly from the respective outer edge of the sheet adjacent the line of perforations so that the line of perforations stops short of the outer edges of the sheet, the single sheet being so folded that the panels of the first row form the envelope, and the sheet is composed of the panels of the next row and of any further rows are folded to lie adjacent one face of the corresponding panels of the first row, whereby the sheet is enclosed in the envelope but can be removed and detached therefrom by tearing along the line of perforations.

16. A method according to claim 11, wherein the multiple-ply label is a longitudinal strip divided into a series of panels by a plurality of transverse fold lines, the first two of the panels forming a front cover and a back cover respectively for enveloping the remaining panel or panels of the strip when folded, the transverse fold lines being spaced along the strip so that upon folding of the strip the said remaining panel or panels is or are folded to lie over the back cover and is or are in turn covered by folding of the front cover about the fold line between the front and back covers and wherein the front cover may extend beyond the area occupied by the back cover, and a band of adhesive is provided on the inner face of the free outer edge of the front cover panel adjacent to said outer edge for securing the outer edge of the front cover either to the back of the folded panel or panels along a region adjacent the fold line which lies between the back cover and the said remaining panel or panels, or to the surface of a support web for carrying the label, the front cover panel being arranged to be torn or otherwise opened to give access to the interior of the folded label.

17. A method according to claim 16, wherein the outer surface of the front cover carries a lithographically printed image.

18. A method according to claim 11, wherein the multiple-ply label is a longitudinal strip divided into two panels by a transverse fold line, the two panels forming a front cover and a back cover respectively for the label when folded and the front surface of the front cover carrying a lithographically printed image, the transverse fold line being spaced along the strip so that upon folding of the strip about the fold line between the front and back covers the front cover lies over the back cover and may extend beyond the area occupied by the back cover, and a band of adhesive is provided on the inner face of the free outer edge of the front cover panel adjacent to said outer edge for securing the outer edge of the front cover either to the back cover or to the surface of a support web for carrying the label, the front cover panel being arranged to be torn or otherwise opened to give access to the interior of the folded label.

19. A method according to claim 1, wherein the envelope containing an article is formed from a single folded sheet, the sheet being divided into a row of three rectilinear panels, the middle panel having at one longitudinal edge thereof a lower panel and at the other longitudinal edge thereof an upper panel which is separated from the middle panel by a line of perforations, the envelope being formed by folding the two outer panels of the row and the lower panel over the rear face of the middle panel so that the envelope is closed either by adhering the rear face of the envelope to a surface or by folding the upper panel or a portion thereof over the face of the middle panel whereby the envelope so closed can be opened by tearing along the line of perforations so that the article therein can be removed.

20. A method according to claim 11, wherein prior to the cutting of the web of the laminar material, the laminar material is passed through one or more printing stations where textual matter is printed onto the web.

* * * * *